United States Patent
Kim et al.

(10) Patent No.: US 12,496,880 B2
(45) Date of Patent: Dec. 16, 2025

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Jeawan Kim, Hwaseong-si (KR); Hochan An, Hwaseong-si (KR); Yeonho Kim, Seoul (KR); Hoyoung Jeong, Hwaseong-si (KR); Man Hee Park, Suwon-si (KR); Yeong Jun Kim, Incheon (KR); Jae Yeon Kim, Hwaseong-si (KR); Gwi Taek Kim, Cheonan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 91 days.

(21) Appl. No.: 18/653,724

(22) Filed: May 2, 2024

(65) Prior Publication Data

US 2025/0170875 A1  May 29, 2025

(30) Foreign Application Priority Data

Nov. 24, 2023  (KR) .................. 10-2023-0166072

(51) Int. Cl.
*B60H 1/32* (2006.01)

(52) U.S. Cl.
CPC ............................... *B60H 1/32284* (2019.05)

(58) Field of Classification Search
CPC ............ B60H 1/32284; B60H 1/00921; B60H 1/143; B60H 1/00278; B60H 1/00007; B60H 1/00385; B60H 1/00478; B60H 1/00899; B60H 1/3204; B60H 2001/00307; B60H 2001/00928; B60H 2001/00949
See application file for complete search history.

(56) References Cited

U.S. PATENT DOCUMENTS

| | | | | |
|---|---|---|---|---|
| 6,125,643 | A | * | 10/2000 | Noda ................. B60H 1/00914 62/196.4 |
| 10,876,777 | B2 | | 12/2020 | Lee |
| 11,254,190 | B2 | | 2/2022 | He |
| 11,560,042 | B2 | | 1/2023 | Brown |
| 2020/0238792 | A1 | * | 7/2020 | Takeichi ............ B60H 1/00892 |

FOREIGN PATENT DOCUMENTS

| | | | | |
|---|---|---|---|---|
| KR | 20210017119 A | * | 2/2021 | ............. B60H 1/143 |
| KR | 20220139061 A | * | 10/2022 | ......... B60H 1/00385 |

* cited by examiner

*Primary Examiner* — Emmanuel E Duke
(74) *Attorney, Agent, or Firm* — Lempia Summerfield Katz LLC (57) ABSTRACT

A heat pump system for a vehicle may include a compressor, a first condenser, a receiver dryer, a second condenser, a first expansion valve, an evaporator, a first refrigerant connection line, a chiller, a second expansion valve, and a gas injection device. The flow of the refrigerant is controlled based on at least one mode for a temperature adjustment of a vehicle interior or for a temperature adjustment of a battery module. As a result, the heat pump system is capable of cooling or heating a vehicle interior by using a high-temperature coolant and a low-temperature coolant. Additionally, the heat pump system is capable of improving a heating performance by employing a gas injection device selectively operating at the time of cooling or heating a vehicle interior to increase the flow amount of the refrigerant.

17 Claims, 5 Drawing Sheets

HEAT PUMP SYSTEM FOR A VEHICLE

CROSS-REFERENCE TO RELATED APPLICATION

This application claims priority to and the benefit of Korean Patent Application No. 10-2023-0166072 filed in the Korean Intellectual Property Office on Nov. 24, 2023, the entire contents of which are incorporated herein by reference.

BACKGROUND

(a) Field of the Disclosure

The present disclosure relates to a heat pump system for a vehicle. More particularly, the present disclosure relates to a heat pump system for a vehicle capable of cooling or heating a vehicle interior, and improving the cooling and heating performance.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by driving a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Recently, in accordance with a continuous increased interest in energy efficiency and environmental pollution, the development of an environmentally-friendly vehicle capable of substantially substituting for an internal combustion engine vehicle is desired. The environmentally-friendly vehicles are classified into electric vehicles driven using a fuel cell or electricity as a power source and hybrid vehicles driven using an engine and a battery.

Among these environmentally-friendly vehicles, a separate heater is not used unlike an air conditioner of a general vehicle. Additionally, an air conditioner used in the environmentally-friendly vehicle is generally called a heat pump system.

The electric vehicle driven by the power source of the fuel cell generates driving force by converting chemical reaction energy between oxygen and hydrogen into electrical energy. In this process, heat energy is generated by a chemical reaction in a fuel cell. Therefore, it is desired to secure performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation of the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain optimal performance of the battery, a plurality of valves for selectively interconnecting connections pipes are employed. Thus, noise and vibration due to frequent opening and closing operations of the valves may be introduced into the vehicle interior, thereby deteriorating the ride comfort.

In addition, when heating the vehicle interior, the heating performance may deteriorate due to the lack of a heat source, the electricity consumption may be increased due to the usage of the electric heater, and the power consumption of the compressor may be increased.

The above information disclosed in this Background section is only to enhance understanding of the background of the disclosure. Therefore, the Background section may contain information that does not form the prior art that is already known to a person of ordinary skill in the art.

SUMMARY

The present disclosure provides a heat pump system for a vehicle capable of cooling or heating a vehicle interior by using a high-temperature coolant and a low-temperature coolant. Additionally, the present disclosure provides a heat pump system capable of improving the heating performance by employing a gas injection device selectively operating at the time of cooling or heating a vehicle interior to increase the flow amount of the refrigerant.

A heat pump system for a vehicle is provided. The heat pump system may include: a compressor configured to compress a refrigerant; a first condenser connected to the compressor via a refrigerant line, and configured to condense the refrigerant supplied from the compressor through heat-exchange with a coolant; a receiver dryer connected to the first condenser via the refrigerant line; and a second condenser connected to the receiver dryer via the refrigerant line and configured to additionally condense the refrigerant supplied from the receiver dryer through heat-exchange with the coolant. The heat pump system may also include: a first expansion valve connected to the second condenser via the refrigerant line; an evaporator connected to the first expansion valve via the refrigerant line and configured to evaporate the refrigerant by exchanging heat between the refrigerant supplied from the first expansion valve and the coolant; and a first refrigerant connection line having a first end connected to the refrigerant line between the compressor and the evaporator and having a second end connected to the refrigerant line between the second condenser and the first expansion valve. The heat pump system may also include a chiller provided on the first refrigerant connection line and configured to adjust a temperature of the coolant by exchanging heat between the refrigerant introduced into the first refrigerant connection line and the coolant that is selectively introduced. The heat pump system may also include a second expansion valve provided on the first refrigerant connection line at an upstream end of the chiller. Additionally, the heat pump system includes a gas injection device connected to the refrigerant line between the second condenser and the first expansion valve. The gas injection device may be configured to exchange heat between the refrigerant supplied from the first condenser and the refrigerant supplied from the second condenser and to selectively supply a partial refrigerant among the heat-exchanged refrigerant to the compressor to increase a flow amount of the refrigerant circulating the refrigerant line. The flow of the refrigerant is controlled based on at least one mode for a temperature adjustment of a vehicle interior or for a temperature adjustment of a battery module.

The gas injection device may include: a heat-exchanger provided on the refrigerant line between the second condenser and the first expansion valve; a second refrigerant connection line having a first end connected to the refrigerant line between the receiver dryer and the second condenser, and a second end connected to the heat-exchanger; a third expansion valve provided on the second refrigerant connection line; and a supply line having a first end connected to the heat-exchanger and a second end connected to the compressor. The supply line may be configured to supply the refrigerant discharged from the heat-exchanger to the compressor.

The heat-exchanger may be operated when the third expansion valve may expand and may supply the refrigerant in the at least one mode. The heat exchanger may be configured to exchange heat between the refrigerant introduced into the second refrigerant connection line and the refrigerant supplied from the second condenser and to supply a gaseous refrigerant among the heat-exchanged refrigerant to the compressor via the supply line to increase the flow amount of the refrigerant circulating the refrigerant line.

Based on the at least one mode, the third expansion valve may be configured to selectively open and close the second refrigerant connection line and to selectively expand the refrigerant introduced into the second refrigerant connection line and supply the expanded refrigerant to the heat-exchanger.

The first expansion valve, the second expansion valve, and the third expansion valve may be 2-way electronic expansion valves selectively operated in the at least one mode and may be configured to selectively expand the refrigerant while controlling the flow of the refrigerant.

The at least one mode may include: a first mode for cooling the battery module while cooling the vehicle interior, in which the gas injection device is operated; a second mode for cooling the battery module while cooling the vehicle interior, in which the gas injection device is not operated; a third mode for recollecting waste heat of an ambient air heat and an electrical component while heating the vehicle interior, in which the gas injection device is operated; and a fourth mode, in which the gas injection device is not operated, for recollecting the ambient air heat and the waste heat of the electrical component while heating the vehicle interior.

In the first mode, the compressor, the first condenser, the receiver dryer, the second condenser, the gas injection device, the first expansion valve, and the evaporator may be interconnected via the refrigerant line. The first refrigerant connection line may be opened by an operation of the second expansion valve. The second refrigerant connection line may be opened by an operation of the third expansion valve. The supply line is opened. The first expansion valve may expand the refrigerant introduced via the refrigerant line and may supply the expanded refrigerant to the evaporator. The second expansion valve may expand the refrigerant introduced via the first refrigerant connection line and may supply the expanded refrigerant to the chiller. The third expansion valve may expand the refrigerant introduced via the second refrigerant connection line and may supply the expanded refrigerant to the heat-exchanger. The heat-exchanger may supply the gaseous refrigerant among the heat-exchanged refrigerant to the compressor via the opened the supply line.

In the second mode, the compressor, the first condenser, the receiver dryer, the second condenser, the gas injection device, the first expansion valve, and the evaporator may be interconnected via the refrigerant line. The first refrigerant connection line may be opened by an operation of the second expansion valve. The second refrigerant connection line may be closed by an operation of the third expansion valve. The supply line may be closed. The first expansion valve may expand the refrigerant introduced via the refrigerant line and may supply the expanded refrigerant to the evaporator. The second expansion valve may expand the refrigerant introduced via the first refrigerant connection line and may supply the expanded refrigerant to the chiller. The operation of the third expansion valve may be stopped.

In the third mode, an operation of the first expansion valve may be stopped. A partial refrigerant line connected to an upstream end and a downstream end of the evaporator may be closed. The first refrigerant connection line may be opened by an operation of the second expansion valve. The second refrigerant connection line may be opened by an operation of the third expansion valve. The supply line may be opened. The second expansion valve may expand the refrigerant introduced via the first refrigerant connection line and may supply the expanded refrigerant to the chiller. The third expansion valve may expand the refrigerant introduced via the second refrigerant connection line and may supply the expanded refrigerant to the heat-exchanger. The heat-exchanger may supply the gaseous refrigerant among the heat-exchanged refrigerant to the compressor via the opened the supply line.

In the fourth mode, an operation of the first expansion valve may be stopped. A partial refrigerant line connected to an upstream end and a downstream end of the evaporator may be closed. The first refrigerant connection line may be opened by an operation of the second expansion valve. The second refrigerant connection line may be closed by an operation of the third expansion valve. The supply line may be closed. The second expansion valve may expand the refrigerant introduced via the first refrigerant connection line and may supply the expanded refrigerant to the chiller. The operation of the third expansion valve may be stopped.

A heat pump system for a vehicle may further include the battery module and a cooling apparatus having a radiator and an electrical component. The first condenser may be connected to the radiator via a first line where the coolant circulates. The second condenser may be connected to the radiator via a second line where the coolant circulates. The chiller may be connected to the radiator via a third line where the coolant circulates. The chiller may be connected to the electrical component via a fourth line where the coolant circulates. The chiller may be connected to the battery module via a fifth line where the coolant circulates. The evaporator may be connected to a cabin cooler via a sixth line where the coolant circulates. The first condenser and the second condenser may be connected to a heater core via a seventh line where the coolant circulates.

The first line and the second line may be opened to connect the first and second condensers to the radiator at the time of cooling the vehicle interior.

When recollecting the ambient air heat at the time of heating the vehicle interior, the third line may be opened to connect the radiator and the chiller.

When recollecting the waste heat of the electrical component at the time of heating the vehicle interior, the fourth line may be opened to connect the electrical component and the chiller.

When cooling the battery module at the time of cooling the vehicle interior, or when recollecting the waste heat of the battery module at the time of heating the vehicle interior, the fifth line may be opened to connect the chiller and the battery module.

The sixth line may be opened to connect the evaporator and the cabin cooler at the time of cooling the vehicle interior.

The seventh line may be opened to connect the first and second condensers to the heater core at the time of heating the vehicle interior.

As described above, according to a heat pump system for a vehicle according to an embodiment, by employing a gas injection device selectively operating at the time of cooling or heating a vehicle interior to increase the flow amount of the refrigerant, the cooling and heating performance may be improved. In addition, according to the present disclosure, the performance of the system by using the gas injection device may be maximized while minimizing the required components. Accordingly, the system may be streamlined and simplified.

In addition, according to the present disclosure, the thermal energy generated during the condensation and evaporation of the refrigerant is selectively exchanged with the coolant. By adjusting the temperature of the vehicle interior by using the heat-exchanged low-temperature or high-temperature coolant, the system may be streamlined and the layout of connection pipes through which refrigerant circulates may be streamlined.

In addition, according to the present disclosure, by selectively recollecting the ambient air heat and the waste heat of the electrical component at the time of heating the vehicle interior, the heating efficiency may be improved. Additionally, the overall travel distance of the vehicle may be increased through an efficient temperature adjustment of the battery module for an optimal performance of the battery module.

In addition, according to an embodiment, it is possible to reduce manufacturing cost and weight through the simplification of an entire system, and thus improve space utilization.

DETAILED DESCRIPTION

Embodiments are hereinafter described in detail with reference to the accompanying drawings.

The embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted. Also, the same elements or equivalents are referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, may be exaggerated for clarity.

In addition, unless explicitly described to the contrary, the terms "comprise" and variations such as "comprises" or "comprising", should be understood to imply the inclusion of stated elements but not the exclusion of any other elements.

Furthermore, terms, such as " . . . unit", " . . . means", " . . . portions", " . . . part", and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

Figure 1:
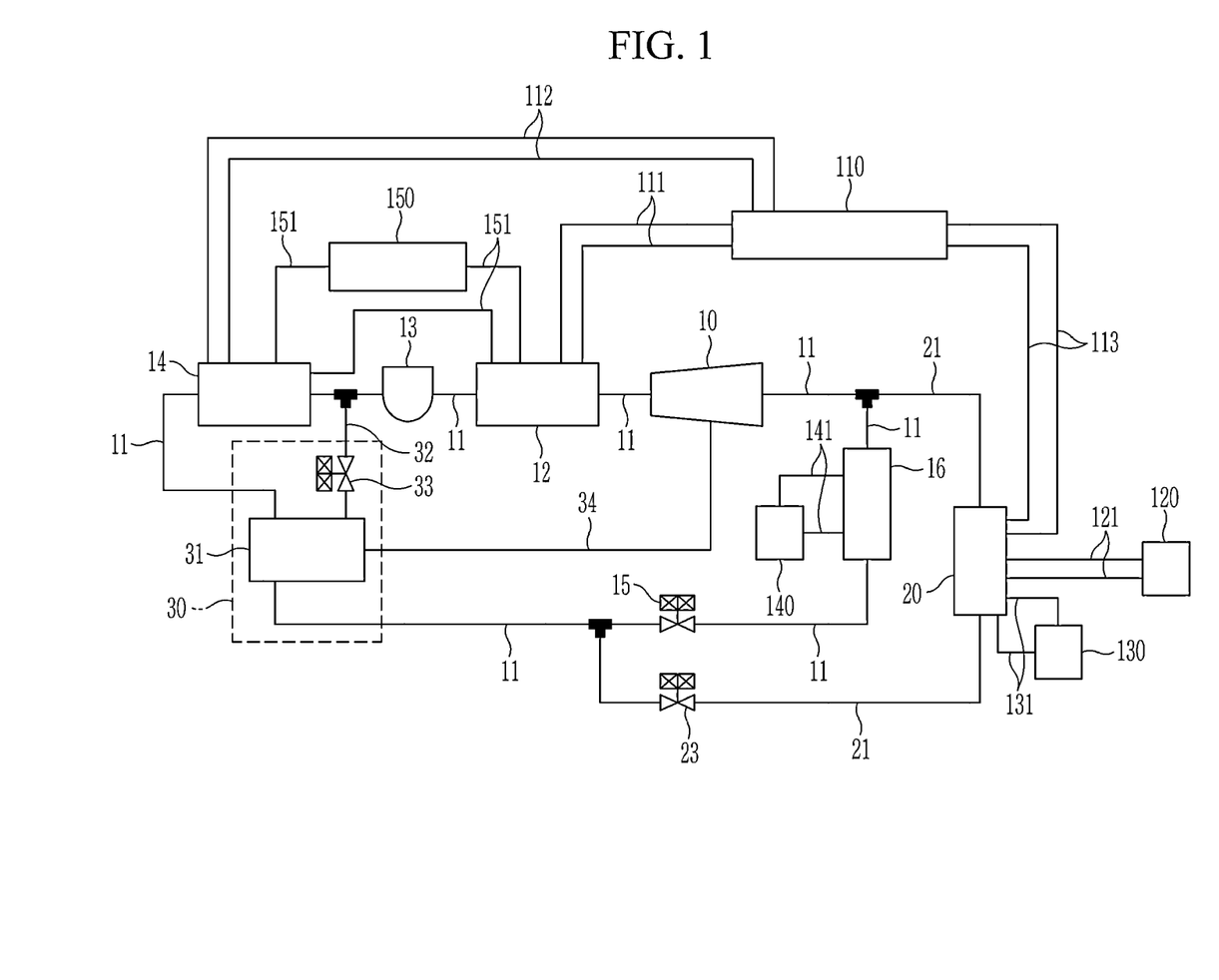
FIG. 1 is a block diagram of a heat pump system for a vehicle according to an embodiment.

FIG. 1 is a block diagram of a heat pump system for a vehicle according to an embodiment.

According to an embodiment of a heat pump system for a vehicle, by employing a gas injection device 30 configured to cool or heat a vehicle interior by using a low-temperature coolant and a high-temperature coolant and selectively operate at the time of cooling or heating the vehicle interior, the cooling and heating performance may be improved.

According to the heat pump system, in an electric vehicle, a cooling apparatus where a coolant is circulated and an air conditioner unit, which is an air-conditioner apparatus for cooling and heating the vehicle interior, may be interconnected with each other.

In other words, referring to FIG. 1, the heat pump system may include the cooling apparatus and the air conditioner unit. The air conditioner unit may include a compressor 10, a first condenser 12, a receiver dryer 13, a second condenser 14, a first expansion valve 15, an evaporator 16, a chiller 20, a first refrigerant connection line 21, a second expansion valve 23, and the gas injection device 30.

The cooling apparatus may include a radiator 110, an electrical component 120, and a battery module 130 connected via the coolant line through which the coolant circulates.

The radiator 110 may be disposed in a frontal region of the vehicle. A cooling fan (not shown) may be provided at a rear of the radiator 110. Accordingly, the radiator 110 may cool the coolant through an operation of the cooling fan and exchange heat with ambient air.

The radiator 110 configured as such may be connected to the first condenser 12 via a first line 111 through which the coolant circulates, and may be connected to the second condenser 14 via a second line 112 through which the coolant circulates.

At the time of cooling the vehicle interior, the first line 111 and the second line 112 may be opened to connect the first and second condensers 12 and 14 to the radiator 110.

In other words, the first line 111 and the second line 112 may always be opened to supply the coolant to the first and second condensers 12 and 14 at the time of cooling the vehicle interior.

The radiator 110 may be connected to the chiller 20 via a third line 113 through which the coolant circulates. When recollecting an ambient air heat at the time of heating the vehicle interior, the third line 113 may be opened to connect the radiator 110 and the chiller 20.

In the present embodiment, the electrical component 120 may be connected to the chiller 20 via a fourth line 121 where the coolant circulates. When recollecting the waste heat of the electrical component 120 at the time of heating the vehicle interior, the fourth line 121 may be opened to connect the electrical component 120 and the chiller 20.

The battery module 130 may be connected to the chiller 20 via a fifth line 131 where the coolant circulates.

When cooling the battery module 130 at the time of cooling the vehicle interior, or when recollecting the waste heat of the battery module 130 at the time of heating the vehicle interior, the fifth line 131 may be opened to connect the chiller 20 and the battery module 130.

The electrical component 120 may include an electric power control unit (EPCU), a motor, an inverter, an on-board charger (OBC), an autonomous driving controller, or the like.

The electric power control apparatus, the inverter, the motor, or the autonomous driving controller may generate heat while being driven. Additionally, the charger may generate heat when charging the battery module 130.

In other words, when recollecting the waste heat of the electrical component 120 at the time of heating the vehicle interior, the heat generated by the electric power control apparatus, motor, inverter, charger, or autonomous driving controller may be recollected.

In the present embodiment, the evaporator 16 may be connected to a cabin cooler 140 via a sixth line 141 where the coolant circulates. Accordingly, the coolant whose temperature is decreased through heat-exchange with the refrigerant at the evaporator 16 may be supplied to the cabin cooler 140 via the sixth line 141 at the time of cooling the vehicle interior.

Then, the ambient air passing through the cabin cooler 140 may be cooled while passing through the cabin cooler 140 by the low-temperature coolant supplied to the cabin cooler 140. The cooled ambient air may be introduced into the vehicle interior, and thereby the vehicle interior may be cooled.

In other words, the sixth line 141 may be opened to connect the evaporator 16 and the cabin cooler 140 at the time of cooling the vehicle interior.

In the present embodiment, the first condenser 12 and the second condenser 14 may be connected to a heater core 150 via a seventh line 151 where the coolant circulates.

Accordingly, the coolant whose temperature is increased through heat-exchange with the refrigerant at the first and second condensers 12 and 14 may be supplied to the heater core 150 via the seventh line 151 at the time of heating the vehicle interior.

The high-temperature coolant supplied to the heater core 150 may increase the temperature of the ambient air passing through the heater core 150. In other words, the introduced ambient air may be converted to a high-temperature state while passing through the heater core 150 and then introduced into the vehicle interior, thereby implementing heating of the vehicle interior.

In other words, the seventh line 151 may be opened to connect the first and second condensers 12 and 14 to the heater core 150 in a heating mode of the vehicle.

The coolant may selectively circulate via the first, second, third, fourth, fifth, sixth, and seventh lines 111, 112, 113, 121, 131, 141, and 151 by an operation of a water pump (not shown).

In the present embodiment, the compressor 10 may compress the supplied refrigerant.

The first condenser 12 may be connected to the compressor 10 via the refrigerant line 11.

The first condenser 12 may exchange heat between the refrigerant supplied from the compressor 10 and the coolant supplied from the radiator 110 via the first line 111, and thereby condense the refrigerant.

On the other hand, the first condenser 12 may condense the refrigerant by exchanging heat between the refrigerant supplied from the compressor 10 and the coolant supplied from the heater core 150 via the seventh line 151 at the time of heating the vehicle interior.

The receiver dryer 13 may be connected to the first condenser 12 via the refrigerant line 11. The receiver dryer 13 may separate the gaseous refrigerant remaining in the refrigerant in the liquid state condensed by the first condenser 12.

In other words, the receiver dryer 13 may separate a gaseous component from the introduced refrigerant, filter moisture and foreign substances, and discharge only the liquid refrigerant.

The second condenser 14 may be connected to the receiver dryer 13 via the refrigerant line 11.

The second condenser 14 may exchange heat between the refrigerant supplied from the receiver dryer 13 and the coolant supplied from the radiator 110 via the second line 112, and thereby additionally condensing the refrigerant.

To the contrary, the second condenser 14 may additionally condense the refrigerant by exchanging heat between the refrigerant supplied from the receiver dryer 13 and the coolant supplied from the heater core 150 via the seventh line 151 at the time of heating the vehicle interior.

In the present embodiment, the first expansion valve 15 may be connected to the second condenser 14 via the refrigerant line 11.

The first expansion valve 15 may expand the introduced refrigerant at the time of cooling the vehicle interior. To the contrary, the first expansion valve 15 may not be operated at the time of heating the vehicle interior.

The evaporator 16 may be connected to the first expansion valve 15 via the refrigerant line 11. The evaporator 16 may evaporate the refrigerant by exchanging heat between the refrigerant supplied from the first expansion valve 15 via the refrigerant line 11 and the coolant supplied from the cabin cooler 140.

A first end of the first refrigerant connection line 21 may be connected to the refrigerant line 11 between the compressor 10 and the evaporator 16. A second end of the first refrigerant connection line 21 may be connected to the refrigerant line 11 between the second condenser 14 and the first expansion valve 15.

The chiller 20 may be provided on the first refrigerant connection line 21. The chiller 20 may selectively circulate the coolant via at least one or all of the third line 113, the fourth line 121, or the fifth line 131.

In other words, the chiller 20 may be a water-cooled heat-exchanger into which the coolant is introduced.

Accordingly, the chiller 20 may adjust a temperature of the coolant by exchanging heat between the refrigerant introduced into the refrigerant connection line 21 and the coolant selectively introduced from at least one or all of the third line 113, the fourth line 121, or the fifth line 131.

In the present embodiment, the second expansion valve 23 may be provided on the first refrigerant connection line 21 at an upstream end of the chiller 20.

The second expansion valve 23 may selectively expand the refrigerant while controlling the flow of the refrigerant.

The upstream end of the chiller 20 and a downstream end of the chiller 20, or the upstream end of the chiller 20 and the downstream end of the chiller 20 may be set based on a flow direction of the refrigerant.

In other words, based on the direction in which the refrigerant flows along the refrigerant line 11, a location at which the refrigerant flows into the chiller 20 may be defined as the upstream end of the chiller 20, and a location where the refrigerant is discharged from the chiller 20 may be defined as the downstream end of the chiller 20.

When cooling the electrical component 120 or the battery module 130 by using the coolant having exchanged heat with the refrigerant, the second expansion valve 23 configured as such may expand the introduced refrigerant and flow the expanded refrigerant to the chiller 20.

In other words, when cooling the electrical component 120 or the battery module 130 at the time of cooling the vehicle interior, the second expansion valve 23 may expand the introduced refrigerant to decrease the temperature and flow the refrigerant into the chiller 20. As a result, the second expansion valve 23 may further decrease the temperature of the coolant passing through the chiller 20.

Accordingly, the coolant whose temperature is decreased while passing through the chiller 20 may be introduced into the electrical component 120 or the battery module 130, such that more efficient cooling may be achieved.

To the contrary, when recollecting the waste heat, or the ambient air heat generated from the electrical component 120 or the battery module 130 at the time of heating the vehicle interior, the second expansion valve 23 may selectively expand the refrigerant introduced via the first refrigerant connection line 21.

At this time, the chiller 20 may recollect the ambient air heat and evaporate the refrigerant by exchanging heat between the coolant supplied from the radiator 110 via the third line 113 and the refrigerant.

In addition, when recollecting the waste heat of the electrical component 120, the chiller 20 may recollect the waste heat of the electrical component 120 and evaporate the refrigerant by exchanging heat between the coolant supplied from the electrical component 120 via the fourth line 121 and the refrigerant.

In addition, when recollecting the waste heat of the battery module 130, the chiller 20 may recollect the waste heat of the battery module 130 and evaporate the refrigerant by exchanging heat between the refrigerant and the coolant supplied from the battery module 130 via the fifth line 131.

In other words, through such operations, the chiller 20 may recollect at least one of the ambient air heat, the waste heat of the electrical component 120, and the waste heat of the battery module 130, and may evaporate the refrigerant.

Although, in the present embodiment, it is described that the chiller 20 recollects at least one of the ambient air heat, the waste heat of the electrical component 120, and the waste heat of the battery module 130, it is not limited thereto. The ambient air heat may be recollected at the evaporator 16.

When the evaporator 16 recollects the ambient air heat, the third line 113 may be configured to connect the evaporator 16 and the radiator 110.

In the present embodiment, the gas injection device 30 may be connected to the refrigerant line 11 between the second condenser 14 and the first expansion valve 15.

The gas injection device 30 may exchange heat between the refrigerant supplied from the first condenser 12 and the refrigerant supplied from the second condenser 14 with each other. Additionally, the gas injection device 30 may selectively supply a partial refrigerant among the heat-exchanged refrigerant to the compressor 10 to increase the flow amount of the refrigerant circulating the refrigerant line 11.

The gas injection device 30 configured as such may be selectively operated at the time of cooling, or heating the vehicle interior.

The gas injection device 30 may include a heat-exchanger 31, a second refrigerant connection line 32, a third expansion a valve 33, and a supply line 34.

First, the heat-exchanger 31 may be provided on the refrigerant line 11 between the second condenser 14 and the first expansion valve 15.

A first end of the second refrigerant connection line 32 may be connected to the refrigerant line 11 between the receiver dryer 13 and the second condenser 14. A second end of the second refrigerant connection line 32 may be connected to the heat-exchanger 31.

The third expansion valve 33 may be provided on the second refrigerant connection line 32.

In other words, based on at least one mode for a temperature adjustment of the vehicle interior or for a temperature adjustment of the battery module 130, the third expansion valve 33 may selectively open and close the second refrigerant connection line 32. Additionally, the third expansion valve 33 may selectively expand the refrigerant introduced into the second refrigerant connection line 32 and supply the expanded refrigerant to the heat-exchanger 31.

For example, when the third expansion valve 33 opens the second refrigerant connection line 32, a partial refrigerant among the refrigerant having passed through the receiver dryer 13 from the first condenser 12 may be introduced into the second refrigerant connection line 32. A remaining refrigerant among the refrigerant having passed through the receiver dryer 13 from the first condenser 12 may be introduced into the second condenser 14 along the refrigerant line 11.

In addition, a first end of the supply line 34 may be connected to the heat-exchanger 31. A second end of the supply line 34 may be connected to the compressor 10.

In other words, the supply line 34 may connect the heat-exchanger 31 and the compressor 10 such that a gaseous refrigerant discharged from the heat-exchanger 31 may be introduced into the compressor 10.

In the gas injection device 30 configured as such, the heat-exchanger 31 may be operated when the third expansion valve 33 expands and supplies the refrigerant in the at least one mode.

In other words, the heat-exchanger 31 may exchange heat between the refrigerant introduced into the second refrigerant connection line 32 and the refrigerant supplied from the second condenser 14 with each other.

Then, the heat-exchanger 31 may supply the gaseous refrigerant among the heat-exchanged refrigerant to the compressor 10 via the supply line 34 to increase the flow amount of the refrigerant circulating the refrigerant line 11.

In the present embodiment, the first expansion valve 15, the second expansion valve 23, and the third expansion valve 33 may be 2-way electronic expansion valves selectively operated in the at least one mode, and configured to selectively expand the refrigerant while controlling the flow of the refrigerant.

The heat pump system configured as such may control the flow of the refrigerant based on at least one mode for the temperature adjustment of the vehicle interior, or the temperature adjustment of the battery module 130.

The at least one mode may include a first mode to a fourth mode.

First, in the first mode, the gas injection device 30 may be operated, and the battery module 130 may be cooled while cooling the vehicle interior.

In the second mode, the gas injection device 30 may not be operated, and the battery module 130 may be cooled while cooling the vehicle interior.

In the third mode, the gas injection device 30 may be operated, and may recollect the ambient air heat and the waste heat of the electrical component 120 while heating the vehicle interior.

In addition, in the fourth mode, the gas injection device 30 may not be operated, and may recollect the ambient air heat and the waste heat of the electrical component 120 while heating the vehicle interior.

An operation and action of a heat pump system according to an embodiment configured as such is described in detail with reference to FIGS. 2-5.

First, in a heat pump system for a vehicle according to an embodiment, an operation according to the first mode for cooling the battery module 130 while cooling the vehicle interior, in which the gas injection device 30 is operated, is described in detail with reference to FIG. 2.

Figure 2:
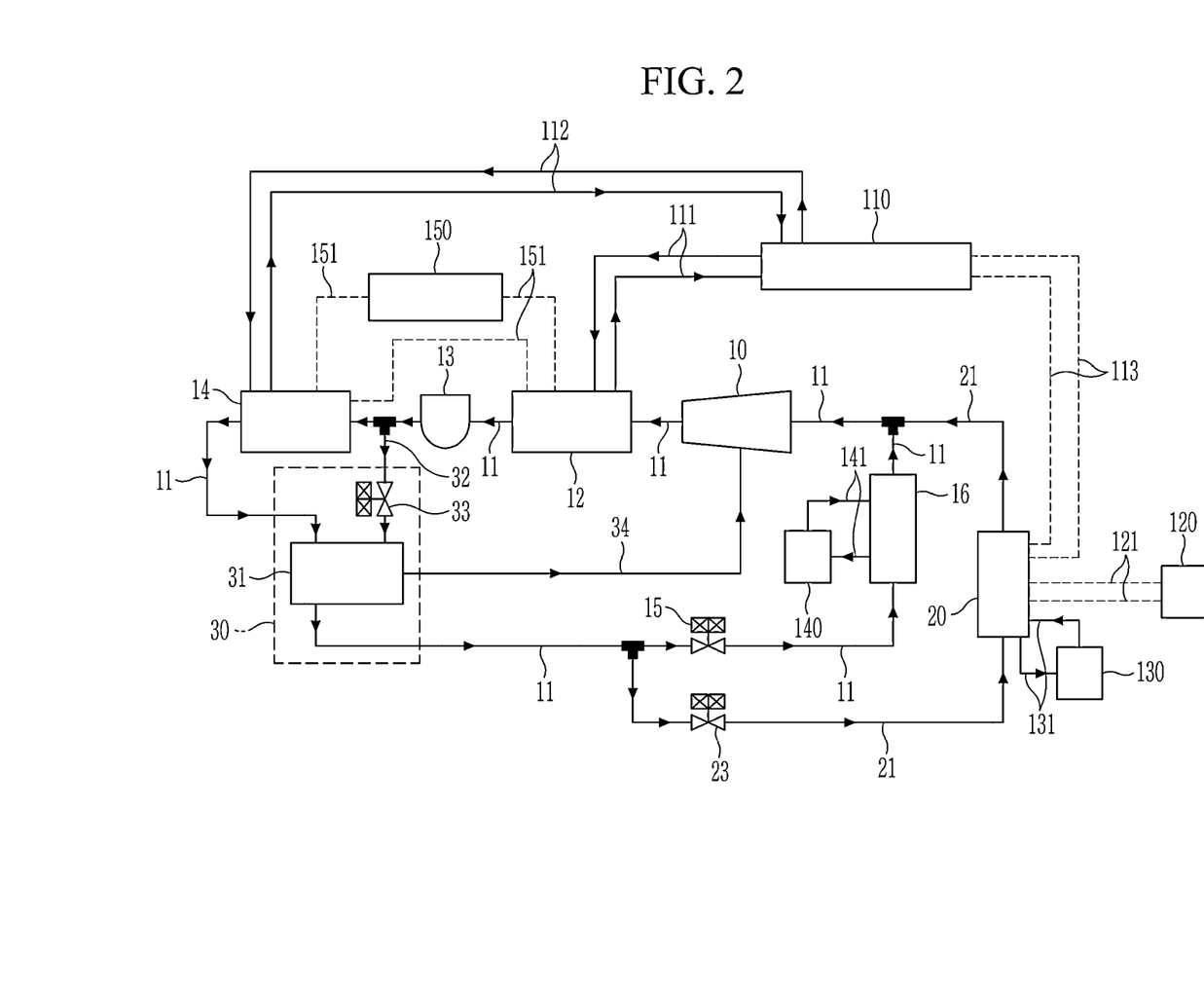
FIG. 2 is an operation diagram according to a first mode of a heat pump system for a vehicle according to an embodiment.

FIG. 2 is an operation diagram according to the first mode of a heat pump system for a vehicle according to an embodiment.

Referring to FIG. 2, in the first mode, the heat pump system may cool the battery module 130, when the gas injection device 30 is operated.

First, in order to cool the vehicle interior, the compressor 10 is operated such that the refrigerant may flow along the refrigerant line 11.

In such a state, the compressor 10, the first condenser 12, the receiver dryer 13, the second condenser 14, the gas injection device 30, the first expansion valve 15 and the evaporator 16 may be interconnected via the refrigerant line 11.

The first line 111 may be opened such that the coolant cooled by the radiator 110 may be supplied to the first condenser 12.

Accordingly, the first condenser 12 may condense the refrigerant by using the coolant supplied from the radiator 110 via the opened first line 111.

The refrigerant having passed through the first condenser 12 may be introduced into the receiver dryer 13 along the refrigerant line 11. The receiver dryer 13 may separate a gaseous component from the introduced refrigerant, filter moisture and foreign substances, and discharge only the liquid refrigerant.

The refrigerant discharged from the receiver dryer 13 may be supplied to the second condenser 14 via the refrigerant line 11.

The second line 112 may be opened such that the coolant cooled by the radiator 110 may be supplied to the second condenser 14. Accordingly, the second condenser 14 may additionally condense the refrigerant supplied from the receiver dryer 13 through heat-exchange with the coolant circulating along the second line 112.

The seventh line 151 connecting the first condenser 12 and the second condenser 14 to the heater core 150 may be closed. Therefore, the coolant may not flow into the heater core 150.

In addition, the refrigerant additionally condensed at the second condenser 14 may be supplied to the gas injection device 30.

In the present embodiment, the first refrigerant connection line 21 may be opened by an operation of the second expansion valve 23.

At this time, the second expansion valve 23 may expand the refrigerant introduced via the first refrigerant connection line 21 and supply the expanded refrigerant to the chiller 20.

The refrigerant introduced into the chiller 20 may cool the coolant while having exchanged heat with the coolant supplied from the battery module 130 via the fifth line 131.

The coolant cooled at the chiller 20 is supplied to the battery module 130 along the fifth line 131. Accordingly, the battery module 130 may be efficiently cooled by the coolant cooled at the chiller 20.

In other words, the coolant circulating via the fifth line 131 may efficiently cool the battery module 130 while repeatedly performing the above-described operation.

In the present embodiment, the second refrigerant connection line 32 may be opened by an operation of the third expansion valve 33. At the same time, the supply line 34 may be opened.

The third expansion valve 33 may expand the refrigerant introduced via the second refrigerant connection line 32 and supply the expanded refrigerant to the heat-exchanger 31.

Accordingly, the heat-exchanger 31 may exchange heat between the refrigerant introduced into the second refrigerant connection line 32 and the refrigerant supplied from the second condenser 14 with each other. Thereafter, the heat-exchanger 31 may supply the gaseous refrigerant among the heat-exchanged refrigerant to the compressor 10 through the supply line 34.

In other words, the gas injection device 30 may flow the gaseous refrigerant discharged from the heat-exchanger 31 back into the compressor 10 via the supply line 34, and thereby, may increase the flow amount of the refrigerant circulating the refrigerant line 11.

The refrigerant introduced into the heat-exchanger 31 from the second condenser 14 may be additionally condensed through heat-exchange with the refrigerant supplied via the second refrigerant connection line 32. Thereafter, the refrigerant may be introduced into the first expansion valve 15 along the refrigerant line 11.

The first expansion valve 15 may expand the refrigerant introduced via the refrigerant line 11 and supply the expanded refrigerant to the evaporator 16.

The refrigerant introduced into the evaporator 16 may be evaporated through heat-exchange with the coolant supplied from the cabin cooler 140 via the sixth line 141.

The ambient air introduced into the vehicle interior may be cooled through heat-exchange with the low-temperature coolant introduced into the cabin cooler 140. Therefore, the cooled ambient air may cool the vehicle interior by being directly introduced into the vehicle interior.

The refrigerant whose condensation level is increased while sequentially passing through the first condenser 12, the second condenser 14, and the heat-exchanger 31 is expanded and supplied to the evaporator 16, and thereby may evaporate the refrigerant to a further lower temperature.

In other words, in the present embodiment, the first condenser 12 may primarily condense the refrigerant, the second condenser 14 may secondarily condense the refrigerant, and a heat-exchanger 31 may additionally condense the refrigerant, such that forming sub-cooling of the refrigerant may be advantageous.

In addition, as the refrigerant having been sub-cooled may be evaporated to a temperature lower than in the evaporator 16, the temperature of the coolant heat-exchanged in the evaporator 16 may be further lowered, and accordingly, the cooling performance and efficiency may be improved.

The refrigerant having passed through the evaporator 16 and the chiller 20 respectively may be introduced into the compressor 10.

In other words, the refrigerant having passed through the evaporator 16, the refrigerant having passed through the chiller 20 and the refrigerant supplied from the heat-exchanger 31 via the supply line 34 may be introduced together into the compressor 10. The introduced refrigerant may be compressed by an operation of the compressor 10.

The refrigerant compressed at the compressor 10 may sequentially pass through the first condenser 12, the receiver dryer 13, and the second condenser 14.

While repeatedly performing the above-described operation, the heat pump system according to an embodiment may increase the flow amount of the refrigerant flowing along the refrigerant line 11.

In addition, the heat pump system may increase the flow amount of the refrigerant flowing along the refrigerant line 11, and accordingly, the overall cooling performance and efficiency may be improved, and the vehicle interior may be efficiently cooled.

Simultaneously, the heat pump system may efficiently cool the battery module 130 by using the low-temperature coolant cooled at the chiller 20.

In the present embodiment, an operation according to the second mode for cooling the battery module 130 while cooling the vehicle interior, in which the gas injection device 30 is not operated, is described in detail with reference to FIG. 3.

Figure 3:
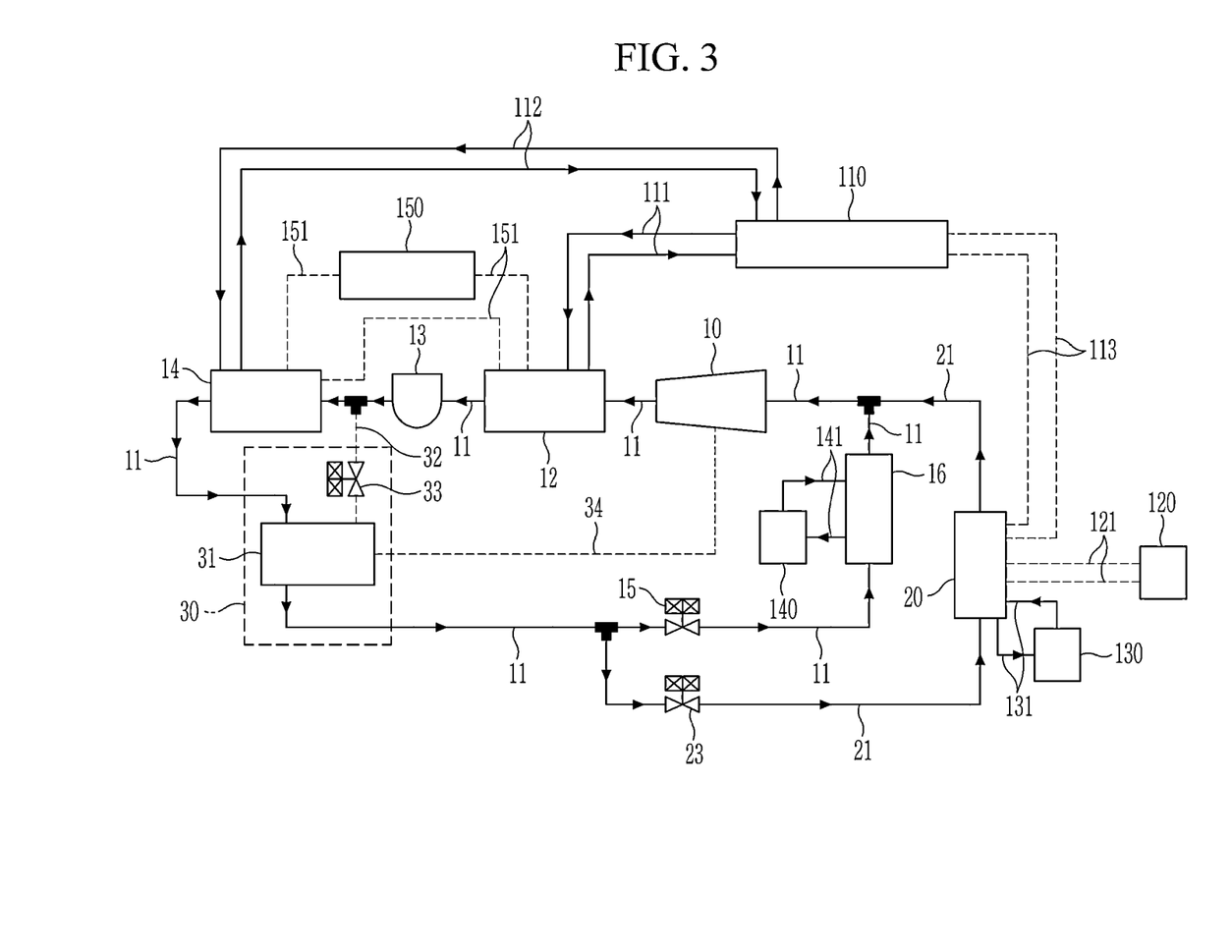
FIG. 3 is an operation diagram according to a second mode of a heat pump system for a vehicle according to an embodiment.

FIG. 3 is an operation diagram according to the second mode of a heat pump system for a vehicle according to an embodiment.

Referring to FIG. 3, in the second mode, the heat pump system may cool the battery module 130, when the gas injection device 30 is not operated.

First, in order to cool the vehicle interior, the compressor 10 is operated such that the refrigerant may flow along the refrigerant line 11.

In such a state, the compressor 10, the first condenser 12, the receiver dryer 13, the second condenser 14, the heat-exchanger 31, the first expansion valve 15, and the evaporator 16 may be interconnected via the refrigerant line 11.

The first line 111 may be opened such that the coolant cooled by the radiator 110 may be supplied to the first condenser 12.

Accordingly, the first condenser 12 may condense the refrigerant by using the coolant supplied from the radiator 110 via the opened first line 111.

The refrigerant having passed through the first condenser 12 may be introduced into the receiver dryer 13 along the refrigerant line 11. The receiver dryer 13 may separate a gaseous component from the introduced refrigerant, filter moisture and foreign substances, and discharge only the liquid refrigerant.

The refrigerant discharged from the receiver dryer 13 may be supplied to the second condenser 14 via the refrigerant line 11.

The second line 112 may be opened such that the coolant cooled by the radiator 110 may be supplied to the second condenser 14. Accordingly, the second condenser 14 may additionally condense the refrigerant supplied from the receiver dryer 13 through heat-exchange with the coolant circulating along the second line 112.

The seventh line 151 connecting the first condenser 12 and the second condenser 14 to the heater core 150 may be closed. Therefore, the coolant may not flow into the heater core 150.

In addition, the refrigerant additionally condensed at the second condenser 14 may be supplied to the heat-exchanger 31.

In the present embodiment, the first refrigerant connection line 21 may be opened by the operation of the second expansion valve 23.

At this time, the second expansion valve 23 may expand the refrigerant introduced via the first refrigerant connection line 21 and supply the expanded refrigerant to the chiller 20.

The refrigerant introduced into the chiller 20 may cool the coolant while having exchanged heat with the coolant supplied from the battery module 130 via the fifth line 131.

The coolant cooled at the chiller 20 is supplied to the battery module 130 along the fifth line 131. Accordingly, the battery module 130 may be efficiently cooled by the coolant cooled at the chiller 20.

In other words, the coolant circulating via the fifth line 131 may efficiently cool the battery module 130 while repeatedly performing the above-described operation.

In the present embodiment, the second refrigerant connection line 32 may be closed by the operation of the third expansion valve 33. At the same time, the supply line 34 may be closed.

The third expansion valve 33 may stop operating. Accordingly, the refrigerant supplied from the second condenser 14 may pass through the heat-exchanger 31.

In other words, in the second mode, the gas injection device 30 may not be operated.

The refrigerant having passed through the heat-exchanger 31 from the second condenser 14 may be introduced into the first expansion valve 15 along the refrigerant line 11.

The first expansion valve 15 may expand the refrigerant introduced via the refrigerant line 11 and supply the expanded refrigerant to the evaporator 16.

The refrigerant introduced into the evaporator 16 may be evaporated through heat-exchange with the coolant supplied from the cabin cooler 140 via the sixth line 141.

The ambient air introduced into the vehicle interior may be cooled through heat-exchange with the low-temperature coolant introduced into the cabin cooler 140. Therefore, the cooled ambient air may cool the vehicle interior by being directly introduced into the vehicle interior.

The refrigerant whose condensation level is increased while sequentially passing through the first condenser 12 and the second condenser 14 is expanded and supplied to the evaporator 16, and thereby may evaporate the refrigerant to a further lower temperature.

In other words, in the present embodiment, the first condenser 12 may primarily condense the refrigerant, and the second condenser 14 may additionally condense the refrigerant, such that forming sub-cooling of the refrigerant may be advantageous.

In addition, as the refrigerant having been sub-cooled may be evaporated to a temperature lower than in the evaporator 16, the temperature of the coolant heat-exchanged in the evaporator 16 may be further lowered. Accordingly, the cooling performance and efficiency may be improved.

The refrigerant having passed through the evaporator 16 and the chiller 20 respectively may be introduced into the compressor 10.

In other words, the refrigerant having passed through the evaporator 16 and the refrigerant having passed through the chiller 20 may be introduced together into the compressor 10. The introduced refrigerant may be compressed by the operation of the compressor 10.

The refrigerant compressed at the compressor 10 may sequentially pass through the first condenser 12, the receiver dryer 13, and the second condenser 14.

While repeatedly performing the above-described operation, the heat pump system according to an embodiment may cool the vehicle interior without the operation of the gas injection device 30.

Simultaneously, the heat pump system may efficiently cool the battery module 130 by using the low-temperature coolant cooled at the chiller 20.

In the present embodiment, an operation according to the third mode, in which the gas injection device 30 is operated, for recollecting the ambient air heat and the waste heat of the electrical component 120 while heating the vehicle interior is described in detail with reference to FIG. 4.

Figure 4:
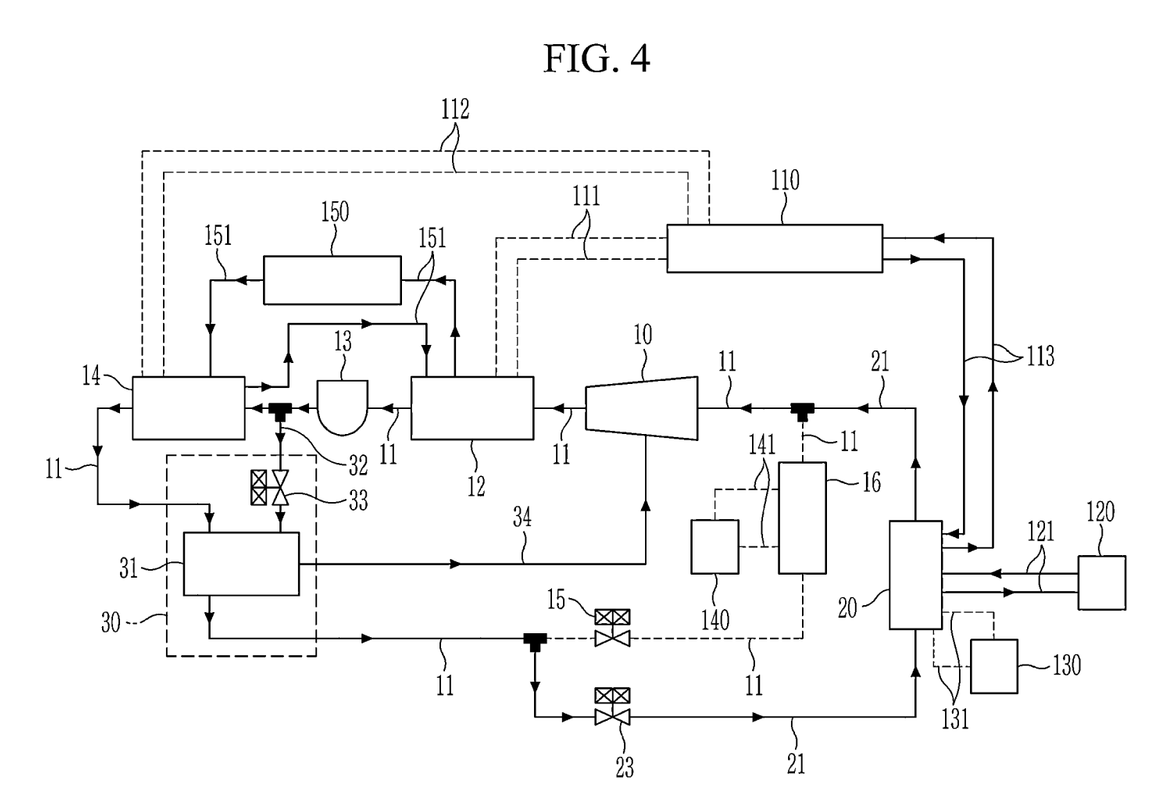
FIG. 4 is an operation diagram according to a third mode of a heat pump system for a vehicle according to an embodiment.

FIG. 4 is an operation diagram according to the third mode of a heat pump system for a vehicle according to an embodiment.

Referring to FIG. 4, in the third mode, the heat pump system may recollect the ambient air heat from ambient air together with the waste heat of the electrical component 120, when the gas injection device 30 is operated.

First, in order to heat the vehicle interior, the compressor 10 is operated such that the refrigerant may flow along the refrigerant line 11.

In such a state, an operation of the first expansion valve 15 may be stopped. In addition, a partial refrigerant line 11 connected to an upstream end and a downstream end of the evaporator 16 may be closed. Accordingly, the refrigerant is not supplied to the evaporator 16.

In addition, the sixth line 141 may be closed such that the coolant may not circulate from the cabin cooler 140 to the evaporator 16.

The upstream end of the evaporator 16 and a downstream end of the evaporator 16 may be set based on the flow direction of the refrigerant.

In other words, based on the direction in which the refrigerant flows along the refrigerant line 11, a location at which the refrigerant flows into the evaporator 16 may be defined as the upstream end of the evaporator 16, and a location where the refrigerant is discharged from the evaporator 16 may be defined as the downstream end of the evaporator 16.

Accordingly, the compressor 10, the first condenser 12, the receiver dryer 13, the second condenser 14, the gas injection device 30 may be interconnected via the refrigerant line 11.

The first line 111 may be closed such that the coolant cooled by the radiator 110 may not be supplied to the first condenser 12. At the same time, the second line 112 may be closed such that the coolant cooled by the radiator 110 may not be supplied to the second condenser 14.

In addition, the third line 113 may be opened such that the coolant may be supplied from the radiator 110 to the chiller 20.

In such a state, the seventh line 151 may be opened such that the heater core 150 may be connected to the first condenser 12 and the second condenser 14.

Accordingly, the refrigerant introduced into the first condenser 12 and the second condenser 14 may be condensed while having exchanged heat with the coolant supplied from the heater core 150 via the seventh line 151.

Then, the coolant whose temperature is increased through heat-exchange with the refrigerant at the first condenser 12 and the second condenser 14 may be supplied to the heater core 150.

In other words, the first condenser 12 may condense the refrigerant by using the coolant supplied from the heater core 150 via the seventh line 151. The refrigerant having passed through the first condenser 12 may be introduced into the receiver dryer 13 along the refrigerant line 11. The receiver dryer 13 may separate a gaseous component from the introduced refrigerant, filter moisture and foreign substances, and discharge only the liquid refrigerant. The refrigerant discharged from the receiver dryer 13 may be supplied to the second condenser 14 via the refrigerant line 11.

At this time, the second condenser 14 may additionally condense the refrigerant supplied from the receiver dryer 13 through heat-exchange with the coolant circulating along the seventh line 151.

The refrigerant additionally condensed at the second condenser 14 may be supplied to the gas injection device 30.

In the present embodiment, the first refrigerant connection line 21 may be opened by the operation of the second expansion valve 23.

At this time, the second expansion valve 23 may expand the refrigerant introduced via the first refrigerant connection line 21 and supply the expanded refrigerant to the chiller 20.

The fourth line 121 may be opened such that the electrical component 120 and the chiller 20 may be connected. At the same time, the fifth line 131 may be closed.

Accordingly, the refrigerant introduced into the chiller 20 may be evaporated through heat-exchange with the coolant supplied from the radiator 110 via the third line 113 and the coolant supplied from the electrical component 120 via the fourth line 121.

The coolant supplied to the chiller 20 may absorb the ambient air heat while passing through the radiator 110, thereby increasing the temperature. Through such operations, the coolant whose temperature is increased may be supplied to the chiller 20.

The chiller 20 may recollect the ambient air heat while exchanging heat between the supplied coolant and the refrigerant.

Simultaneously, the refrigerant introduced into the chiller 20 may cool the coolant while having exchanged heat with the coolant supplied from the electrical component 120 via the fourth line 121.

At this time, the coolant may recollect the waste heat from the electrical component 120 while cooling the electrical component 120, thereby increasing the temperature. Through such operations, the coolant whose temperature is increased may be supplied to the chiller 20.

the chiller 20 may recollect the waste heat of the electrical component 120 while exchanging heat between the coolant supplied from the electrical component 120 via the fourth line 121 and the refrigerant.

The second refrigerant connection line 32 may be opened by the operation of the third expansion valve 33. At the same time, the supply line 34 may be opened.

The third expansion valve 33 may expand the refrigerant introduced via the supply line 34.

In other words, the second refrigerant connection line 32 may supply the expanded refrigerant to the heat-exchanger 31.

Accordingly, the heat-exchanger 31 may exchange heat between the refrigerant introduced into the second refrigerant connection line 32 and the refrigerant supplied from the second condenser 14. Thereafter, the heat-exchanger 31 may supply the gaseous refrigerant among the heat-exchanged refrigerant to the compressor 10 through the supply line 34.

In other words, the gas injection device 30 may flow the gaseous refrigerant discharged from the heat-exchanger 31 back into the compressor 10 via the supply line 34, and thereby, may increase the flow amount of the refrigerant circulating the refrigerant line 11.

The refrigerant introduced into the heat-exchanger 31 from the second condenser 14 may be additionally condensed through heat-exchange with the refrigerant supplied via the second refrigerant connection line 32. Thereafter, the refrigerant may be introduced into the chiller 20 along the first refrigerant connection line 21.

The refrigerant having passed through the chiller 20 may be introduced into the compressor 10.

In other words, the refrigerant having passed through the chiller 20 and the refrigerant supplied from the heat-exchanger 31 via the supply line 34 may be introduced together into the compressor 10. The introduced refrigerant may be compressed by the operation of the compressor 10.

The refrigerant compressed at the compressor 10 may sequentially pass through the first condenser 12, the receiver dryer 13, and the second condenser 14.

Accordingly, the refrigerant introduced into the first condenser 12 and the second condenser 14 may be condensed while having exchanged heat with the coolant supplied from the heater core 150 via the seventh line 151.

Accordingly, the coolant whose temperature is increased through heat-exchange with the refrigerant at the first condenser 12 and the second condenser 14 may be supplied to the heater core 150.

The ambient air introduced into the vehicle interior may be converted into the high temperature state through heat-exchange with the high-temperature coolant introduced into the heater core 150 and flowed into the vehicle interior. Accordingly, heating of the vehicle interior may be implemented.

Accordingly, the refrigerant circulating in the heat pump system may recollect the ambient air heat at the chiller 20, and at the same time, smoothly recollect the waste heat from the coolant whose temperature is increased while passing through the electrical component 120, such that the overall heating performance and efficiency may be improved.

In addition, according to the present disclosure, the heating efficiency and performance may be improved while minimizing the usage of a separate electric heater.

In addition, the gas injection device 30 may increase the flow amount of the refrigerant circulating the refrigerant line 11, and thereby the heating performance may be maximized.

Although the present embodiment has described that the waste heat of the electrical component 120 and the ambient air heat are recollected together, it is not limited thereto. At least one of the ambient air heat, the waste heat of the electrical component 120, and the waste heat of the battery module 130 may be selectively recollected.

In addition, although, in the present embodiment, it is described that the radiator 110 is connected to the chiller 20 via the third line 113, it is not limited thereto. The third line 113 may be connected to the evaporator 16 instead of the chiller 20.

In other words, in the state that the third line 113 is connected to the evaporator 16, when recollecting the ambient air heat at the time of heating the vehicle interior, the refrigerant may flow to the evaporator 16 to recollect the ambient air heat through heat-exchange between the refrigerant and the coolant at the evaporator 16.

In addition, in the present embodiment, an operation according to the fourth mode, in which the gas injection device 30 is not operated, for recollecting the ambient air heat and the waste heat of the electrical component 120 while heating the vehicle interior is described in detail with reference to FIG. 5.

Figure 5:
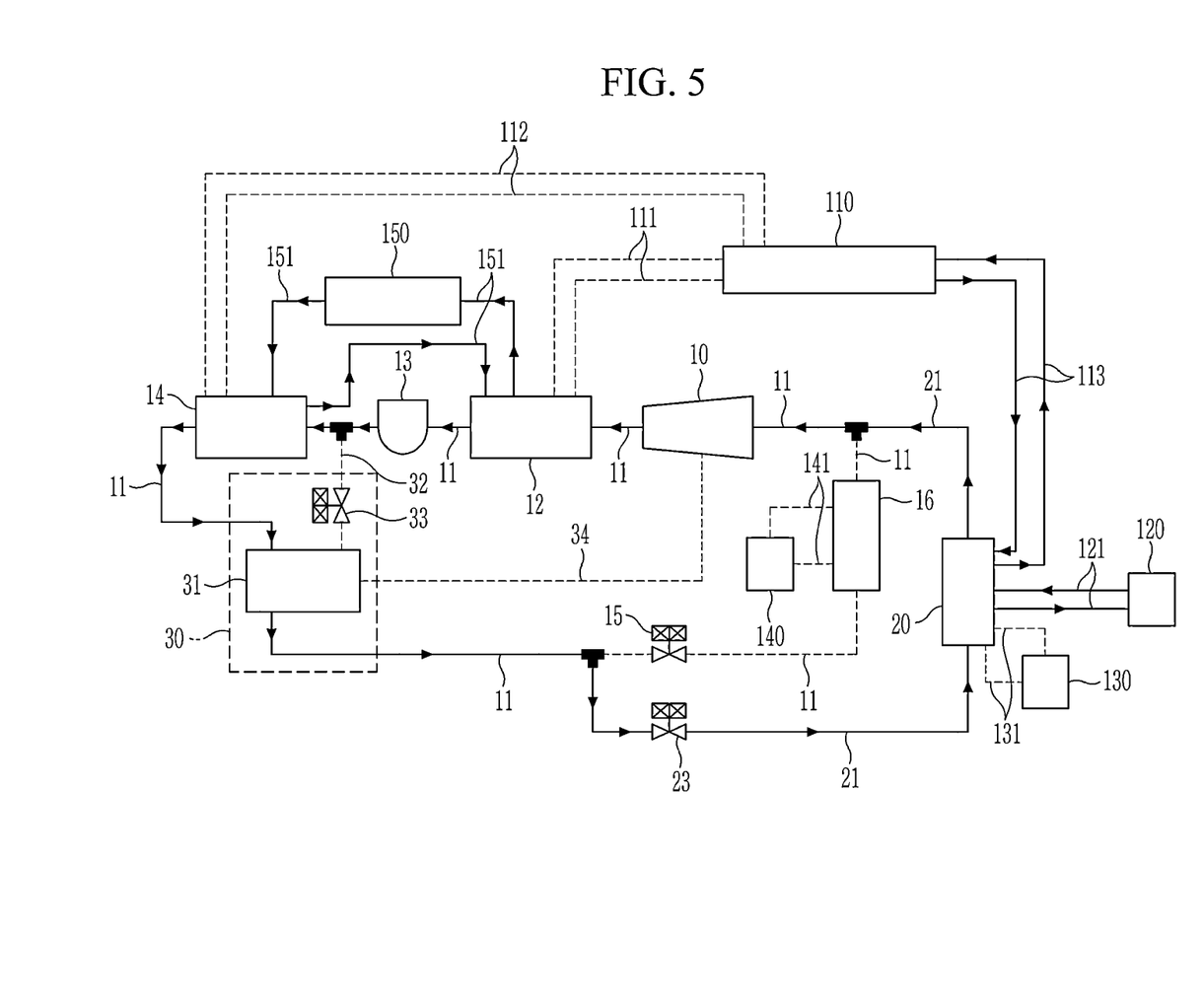
FIG. 5 is an operation diagram according to a fourth mode of a heat pump system for a vehicle according to an embodiment.

FIG. 5 is an operation diagram according to the fourth mode of a heat pump system for a vehicle according to an embodiment.

Referring to FIG. 5, in the fourth mode, the heat pump system may recollect the ambient air heat from ambient air together with the waste heat of the electrical component 120, when the gas injection device 30 is not operated.

First, in order to heat the vehicle interior, the compressor 10 is operated such that the refrigerant may flow along the refrigerant line 11.

In such a state, the operation of the first expansion valve 15 may be stopped. In addition, the partial refrigerant line 11 connected to the upstream end and downstream end of the evaporator 16 may be closed. Accordingly, the refrigerant is not supplied to the evaporator 16.

In addition, the sixth line 141 may be closed such that the coolant may not circulate from the cabin cooler 140 to the evaporator 16.

The upstream end of the evaporator 16 and the downstream end of the evaporator 16 may be set based on the flow direction of the refrigerant.

In other words, based on the direction in which the refrigerant flows along the refrigerant line 11, a location at which the refrigerant flows into the evaporator 16 may be defined as the upstream end of the evaporator 16, and a location where the refrigerant is discharged from the evaporator 16 may be defined as the downstream end of the evaporator 16.

Accordingly, the compressor 10, the first condenser 12, the receiver dryer 13, the second condenser 14, and the heat-exchanger 31 may be interconnected via the refrigerant line 11.

The first line 111 may be closed such that the coolant cooled by the radiator 110 may not be supplied to the first condenser 12. At the same time, the second line 112 may be closed such that the coolant cooled by the radiator 110 may not be supplied to the second condenser 14.

In addition, the third line 113 may be opened such that the coolant may be supplied from the radiator 110 to the chiller 20.

In such a state, the seventh line 151 may be opened such that the heater core 150 may be connected to the first condenser 12 and the second condenser 14.

Accordingly, the refrigerant introduced into the first condenser 12 and the second condenser 14 may be condensed while having exchanged heat with the coolant supplied from the heater core 150 via the seventh line 151.

Then, the coolant whose temperature is increased through heat-exchange with the refrigerant at the first condenser 12 and the second condenser 14 may be supplied to the heater core 150.

In other words, the first condenser 12 may condense the refrigerant by using the coolant supplied from the heater core 150 via the seventh line 151.

The refrigerant having passed through the first condenser 12 may be introduced into the receiver dryer 13 along the refrigerant line 11. The receiver dryer 13 may separate a gaseous component from the introduced refrigerant, filter moisture and foreign substances, and discharge only the liquid refrigerant.

The refrigerant discharged from the receiver dryer 13 may be supplied to the second condenser 14 via the refrigerant line 11.

At this time, the second condenser 14 may additionally condense the refrigerant supplied from the receiver dryer 13 through heat-exchange with the coolant circulating along the seventh line 151.

The refrigerant additionally condensed at the second condenser 14 may be supplied to the heat-exchanger 31.

In the present embodiment, the first refrigerant connection line 21 may be opened by the operation of the second expansion valve 23.

At this time, the second expansion valve 23 may expand the refrigerant introduced via the first refrigerant connection line 21 and supply the expanded refrigerant to the chiller 20.

The fourth line 121 may be opened such that the electrical component 120 and the chiller 20 may be connected. At the same time, the fifth line 131 may be closed.

Accordingly, the refrigerant introduced into the chiller 20 may be evaporated through heat-exchange with the coolant supplied from the radiator 110 via the third line 113 and the coolant supplied from the electrical component 120 via the fourth line 121.

The coolant supplied to the chiller 20 may absorb the ambient air heat while passing through the radiator 110, thereby increasing the temperature. Through such operations, the coolant whose temperature is increased may be supplied to the chiller 20.

The chiller 20 may recollect the ambient air heat while exchanging heat between the supplied coolant and the refrigerant.

Simultaneously, the refrigerant introduced into the chiller 20 may cool the coolant while having exchanged heat with the coolant supplied from the electrical component 120 via the fourth line 121.

At this time, the coolant may recollect the waste heat from the electrical component 120 while cooling the electrical component 120, thereby increasing the temperature. Through such operations, the coolant whose temperature is increased may be supplied to the chiller 20.

The chiller 20 may recollect the waste heat of the electrical component 120 while exchanging heat between the coolant supplied from the electrical component 120 via the fourth line 121 and the refrigerant.

The second refrigerant connection line 32 may be closed by the operation of the third expansion valve 33. At the same time, the supply line 34 may be closed.

The third expansion valve 33 may stop operating. Accordingly, the refrigerant supplied from the second condenser 14 may pass through the heat-exchanger 31.

In other words, in the fourth mode, the gas injection device 30 may not be operated.

The refrigerant having passed through the heat-exchanger 31 from the second condenser 14 may be introduced into the chiller 20 along the first refrigerant connection line 21 connected to the refrigerant line 11.

The refrigerant having passed through the chiller 20 may be introduced into the compressor 10.

In other words, the refrigerant having passed through the chiller 20 may be introduced into the compressor 10. The introduced refrigerant may be compressed by the operation of the compressor 10.

The refrigerant compressed at the compressor 10 may sequentially pass through the first condenser 12, the receiver dryer 13, and the second condenser 14.

Accordingly, the refrigerant introduced into the first condenser 12 and the second condenser 14 may be condensed while having exchanged heat with the coolant supplied from the heater core 150 via the seventh line 151.

Accordingly, the coolant whose temperature is increased through heat-exchange with the refrigerant at the first condenser 12 and the second condenser 14 may be supplied to the heater core 150.

The ambient air introduced into the vehicle interior may be converted into the high temperature state through heat-exchange with the high-temperature coolant introduced into the heater core 150 and flowed into the vehicle interior. Accordingly, heating of the vehicle interior may be implemented.

Accordingly, the refrigerant circulating in the heat pump system may recollect the ambient air heat at the chiller 20, and at the same time, smoothly recollect the waste heat from the coolant whose temperature is increased while passing through the electrical component 120, such that the overall heating performance and efficiency may be improved.

In addition, according to the present disclosure, the heating efficiency and performance may be improved while minimizing the usage of a separate electric heater.

Although the present embodiment has described that the waste heat of the electrical component 120 and the ambient air heat are recollected together, is not limited thereto. At least one of the ambient air heat, the waste heat of the electrical component 120, and the waste heat of the battery module 130 may be selectively recollected.

In addition, although, in the present embodiment, it is described that the radiator 110 is connected to the chiller 20 via the third line 113, it is not limited thereto. The third line 113 may be connected to the evaporator 16 instead of the chiller 20.

In other words, in the state that the third line 113 is connected to the evaporator 16, when recollecting the ambient air heat at the time of heating the vehicle interior, the refrigerant may flow to the evaporator 16 to recollect the ambient air heat through heat-exchange between the refrigerant and the coolant at the evaporator 16.

Therefore, as described above, when a heat pump system for a vehicle according to an embodiment is applied, at the time of cooling or heating the vehicle interior, the flow amount of the refrigerant may be increased by employing the gas injection device 30 configured to selectively operate. As a result, the cooling and the heating performance of the heat pump system may be improved.

In addition, according to the present disclosure, the performance of the system by using the gas injection device 30 may be maximized while minimizing the required components. Accordingly, the heat pump system may be streamlined and simplified.

In addition, according to the present disclosure, the thermal energy generated during the condensation and evaporation of the refrigerant is selectively exchanged with the coolant. By adjusting the temperature of the vehicle interior by using the heat-exchanged low-temperature or high-temperature coolant, the system may be streamlined and the layout of connection pipes through which the refrigerant circulates may be streamlined.

In addition, according to the present disclosure, by selectively recollecting the ambient air heat and the waste heat of the electrical component 120 at the time of heating the vehicle interior, the heating efficiency may be improved. Additionally, the overall travel distance of the vehicle may be increased through an efficient temperature adjustment of the battery module 130 for optimal performance of the battery module 130.

In addition, according to an embodiment, it is possible to reduce manufacturing cost and weight through the simplification of an entire system, and thus improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

10: compressor
11: refrigerant line
12: first condenser
13: receiver dryer
14: second condenser
15: first expansion valve
16: evaporator
20: chiller
21: first refrigerant connection line
23: second expansion valve
30: gas injection device
31: heat-exchanger
32: second refrigerant connection line
33: third expansion valve
34: supply line
110: radiator
111, 112, 113: first, second, and third line
120: electrical component
121: fourth line
130: battery module
131: fifth line
140: cabin cooler
141: sixth line
150: heater core
151: seventh line

What is claimed is:

1. A heat pump system for a vehicle, the heat pump system comprising:
a compressor configured to compress a refrigerant;
a first condenser connected to the compressor via a refrigerant line, and configured to condense the refrigerant supplied from the compressor through heat-exchange with a coolant;
a receiver dryer connected to the first condenser via the refrigerant line;
a second condenser connected to the receiver dryer via the refrigerant line, and configured to additionally condense the refrigerant supplied from the receiver dryer through heat-exchange with the coolant;
a first expansion valve connected to the second condenser via the refrigerant line;
an evaporator connected to the first expansion valve via the refrigerant line, and configured to evaporate the refrigerant by exchanging heat between the refrigerant supplied from the first expansion valve and the coolant;
a first refrigerant connection line having a first end connected to the refrigerant line between the compressor and the evaporator, and a second end connected to the refrigerant line between the second condenser and the first expansion valve;
a chiller provided on the first refrigerant connection line, and configured to adjust a temperature of the coolant by exchanging heat between the refrigerant introduced into the first refrigerant connection line and the coolant that is selectively introduced;
a second expansion valve provided on the first refrigerant connection line at an upstream end of the chiller; and
a gas injection device connected to the refrigerant line between the second condenser and the first expansion valve, the gas injection device being configured to exchange heat between the refrigerant supplied from the first condenser and the refrigerant supplied from the second condenser, and configured to selectively supply a partial refrigerant among the heat-exchanged refrigerant to the compressor to increase a flow amount of the refrigerant circulating via the refrigerant line,
wherein flow of the refrigerant is controlled based on at least one mode for a temperature adjustment of a vehicle interior or for a temperature adjustment of a battery module.

2. The heat pump system of claim 1, wherein the gas injection device comprises:
a heat-exchanger provided on the refrigerant line between the second condenser and the first expansion valve;
a second refrigerant connection line having a first end connected to the refrigerant line between the receiver dryer and the second condenser, and a second end connected to the heat-exchanger;
a third expansion valve provided on the second refrigerant connection line; and
a supply line having a first end connected to the heat-exchanger and a second end connected to the compressor, and configured to supply the refrigerant discharged from the heat-exchanger to the compressor.

3. The heat pump system of claim 2, wherein the heat-exchanger is operated when the third expansion valve expands and supplies the refrigerant in the at least one mode, the heat-exchanger configured to exchange heat between the refrigerant introduced into the second refrigerant connection line and the refrigerant supplied from the second condenser and to supply a gaseous refrigerant among the heat-exchanged refrigerant to the compressor via the supply line to increase the flow amount of the refrigerant circulating the refrigerant line.

4. The heat pump system of claim 2, wherein, based on the at least one mode, the third expansion valve is configured to selectively open and close the second refrigerant connection line and to selectively expand the refrigerant introduced into the second refrigerant connection line and supply the expanded refrigerant to the heat-exchanger.

5. The heat pump system of claim 2, wherein the first expansion valve, the second expansion valve, and the third expansion valve are 2-way electronic expansion valves configured to selectively operate in the at least one mode and to selectively expand the refrigerant while controlling the flow of the refrigerant.

6. The heat pump system of claim 2, wherein the at least one mode comprises:
   a first mode for cooling the battery module while cooling the vehicle interior, in which the gas injection device is operated;
   a second mode for cooling the battery module while cooling the vehicle interior, in which the gas injection device is not operated;
   a third mode for recollecting waste heat of an ambient air heat and an electrical component while heating the vehicle interior, in which the gas injection device is operated; and
   a fourth mode, in which the gas injection device is not operated, for recollecting the ambient air heat and the waste heat of the electrical component while heating the vehicle interior.

7. The heat pump system of claim 6, wherein, in the first mode:
   the compressor, the first condenser, the receiver dryer, the second condenser, the gas injection device, the first expansion valve and the evaporator are interconnected via the refrigerant line;
   the first refrigerant connection line is opened by an operation of the second expansion valve;
   the second refrigerant connection line is opened by an operation of the third expansion valve;
   the supply line is opened;
   the first expansion valve expands the refrigerant introduced via the refrigerant line and supplies the expanded refrigerant to the evaporator;
   the second expansion valve expands the refrigerant introduced via the first refrigerant connection line and supplies the expanded refrigerant to the chiller;
   the third expansion valve expands the refrigerant introduced via the second refrigerant connection line and supplies the expanded refrigerant to the heat-exchanger; and
   the heat-exchanger supplies a gaseous refrigerant among the heat-exchanged refrigerant to the compressor via the opened the supply line.

8. The heat pump system of claim 6, wherein, in the second mode:
   the compressor, the first condenser, the receiver dryer, the second condenser, the gas injection device, the first expansion valve and the evaporator are interconnected via the refrigerant line;
   the first refrigerant connection line is opened by an operation of the second expansion valve;
   the second refrigerant connection line is closed by an operation of the third expansion valve;
   the supply line is closed;
   the first expansion valve expands the refrigerant introduced via the refrigerant line and supplies the expanded refrigerant to the evaporator;
   the second expansion valve expands the refrigerant introduced via the first refrigerant connection line and supplies the expanded refrigerant to the chiller; and
   the operation of the third expansion valve is stopped.

9. The heat pump system of claim 6, wherein, in the third mode:
   an operation of the first expansion valve is stopped;
   a partial refrigerant line connected to an upstream end and a downstream end of the evaporator is closed;
   the first refrigerant connection line is opened by an operation of the second expansion valve;
   the second refrigerant connection line is opened by an operation of the third expansion valve;
   the supply line is opened;
   the second expansion valve expands the refrigerant introduced via the first refrigerant connection line and supplies the expanded refrigerant to the chiller;
   the third expansion valve expands the refrigerant introduced via the second refrigerant connection line and supplies the expanded refrigerant to the heat-exchanger; and
   the heat-exchanger supplies a gaseous refrigerant among the heat-exchanged refrigerant to the compressor via the opened the supply line.

10. The heat pump system of claim 6, wherein, in the fourth mode:
    an operation of the first expansion valve is stopped;
    a partial refrigerant line connected to an upstream end and a downstream end of the evaporator is closed;
    the first refrigerant connection line is opened by an operation of the second expansion valve;
    the second refrigerant connection line is closed by an operation of the third expansion valve;
    the supply line is closed;
    the second expansion valve expands the refrigerant introduced via the first refrigerant connection line and supplies the expanded refrigerant to the chiller; and
    the operation of the third expansion valve is stopped.

11. The heat pump system of claim 2, further comprising a cooling apparatus including a radiator and an electrical component, wherein:
    the first condenser is connected to the radiator via a first line where the coolant circulates;
    the second condenser is connected to the radiator via a second line where the coolant circulates;
    the chiller is connected to the radiator via a third line where the coolant circulates;
    the chiller is connected to the electrical component via a fourth line where the coolant circulates;
    the chiller is connected to the battery module via a fifth line where the coolant circulates;
    the evaporator is connected to a cabin cooler via a sixth line where the coolant circulates; and
    the first condenser and the second condenser are connected to a heater core via a seventh line where the coolant circulates.

12. The heat pump system of claim 11, wherein the first line and the second line are opened to connect the first and second condensers to the radiator at a time of cooling the vehicle interior.

13. The heat pump system of claim 11, wherein, when recollecting an ambient air heat at a time of heating the vehicle interior, the third line is opened to connect the radiator and the chiller.

14. The heat pump system of claim 11, wherein, when recollecting waste heat of the electrical component at a time of heating the vehicle interior, the fourth line is opened to connect the electrical component and the chiller.

15. The heat pump system of claim 11, wherein, when cooling the battery module at a time of cooling the vehicle interior, or when recollecting waste heat of the battery module at a time of heating the vehicle interior, the fifth line is opened to connect the chiller and the battery module.

16. The heat pump system of claim 11, wherein the sixth line is opened to connect the evaporator and the cabin cooler at a time of cooling the vehicle interior.

17. The heat pump system of claim 11, wherein the seventh line is opened to connect the first and second condensers to the heater core at a time of heating the vehicle interior.

* * * * *